United States Patent [19]

Otto et al.

[11] 4,212,600
[45] Jul. 15, 1980

[54] VEHICLE FUEL TANK HAVING VENTED INTERNAL FUEL PUMP

[75] Inventors: Heinz Otto, Wolfsburg; Helmut Hoppmann; Bodo Henning, both of Brunswick, all of Fed. Rep. of Germany

[73] Assignee: Volkswagenwerk Aktiengesellschaft, Wolfsburg, Fed. Rep. of Germany

[21] Appl. No.: 909,698

[22] Filed: May 25, 1978

[30] Foreign Application Priority Data

Nov. 2, 1977 [DE] Fed. Rep. of Germany ....... 2748963

[51] Int. Cl.$^2$ .................. F04B 17/00; F01D 5/10
[52] U.S. Cl. ..................... 417/360; 417/435; 415/119; 137/587; 417/363
[58] Field of Search ........... 417/360, 363, 435, 313; 415/119; 123/DIG. 7, 136; 137/583, 587

[56] References Cited

U.S. PATENT DOCUMENTS

| | | | |
|---|---|---|---|
| 2,330,634 | 9/1943 | Shoemeker | 417/435 |
| 2,832,292 | 4/1958 | Edwards | 417/360 |
| 2,973,716 | 3/1961 | Thomas | 415/119 |
| 3,395,775 | 8/1968 | Smith | 415/119 X |
| 3,676,025 | 7/1972 | Shulte et al. | 415/119 X |

*Primary Examiner*—Richard E. Gluck
*Attorney, Agent, or Firm*—Brumbaugh, Graves, Donohue & Raymond

[57] ABSTRACT

A fuel pump assembly is designed for mounting in the interior of a vehicle fuel tank. The assembly includes a reserve tank and a fuel pump mounted within the reserve tank with a noise dampening cylindrical intermediate layer. An intake chamber is formed by a filter screen which is mounted in the reserve tank surrounding the inlet of the fuel pump. A vent channel is provided bypassing the intermediate layers and connecting the intake chamber with a vent conduit for venting gases from the intake chamber of the fuel pump.

3 Claims, 3 Drawing Figures

VEHICLE FUEL TANK HAVING VENTED INTERNAL FUEL PUMP

BACKGROUND OF THE INVENTION

This invention relates to vehicle fuel tanks and particularly fuel tanks wherein a fuel pump assembly is provided on the interior of the tank. In particular, the present invention relates to an arrangement for venting the fuel intake chamber of the fuel pump assembly.

When a fuel pump, including a filtering screen, is provided within a reserve tank at the bottom of a fuel tank, the intake chamber between the filtering screen and the pump intake should be vented for the removal of air bubbles or vapors which may be taken up into the pump itself and thereafter cause problems in the fuel lines.

It is an object of the present invention to provide an arrangement for effectively and inexpensively venting a fuel pump assembly having a filtering screen.

SUMMARY OF THE INVENTION

In accordance with the invention, a fuel pump assembly is provided for mounting within a vehicle fuel tank. The assembly includes a reserve tank, a fuel pump having an intake and mounted within the reserve tank by at least one noise dampening cylindrical intermediate layer, and a filter screen mounted to the reserve tank surrounding the pump intake and forming an intake chamber. A vent conduit sealed against fluid entry from the fuel tank is provided, and a vent channel bypassing the intermediate layer is connected between the intake chamber and the vent conduit.

In one embodiment, the vent channel extends within the body of the intermediate layer. In another embodiment there is provided a first annular chamber surrounding the intermediate layer and comprising a fuel return chamber into which excess fuel outlet of the pump is provided. The first annular chamber is connected to the vent conduit and the vent channel. The excess fuel is returned to the intake chamber by the vent channel. In this case, the vent channel may consist of a second annular chamber surrounding the intermediate layer and connected to the first annular chamber by an upper overflow means, and the vent conduit may be connected to the first annular chamber near the overflow means. In one arrangement the filtering screen is cylindrical in shape and rendered sufficiently strong in its axial direction to support one axial end of the intermediate layer.

In accordance with the invention the venting conduit, which is connected to the intake chamber provides a gas removal path which is closed off with respect to the fluid in the tank, so that the fluid cannot bypass the filtering screen by reverse flow through the venting conduit. The venting conduit may open into an upper air volume within the tank itself or may pass through the cover of the vehicle tank for venting on the outside of the tank. The arrangements in accordance with the invention contemplates the return of excess fuel pump output to the intake of the fuel pump located within the reserve tank. Such return flow may be provided directly to the intake chamber bypassing the filter surrounding the pump intake. This return fluid need not pass through the screen before being taken up by the pump intake, since it has previously passed through the screen on its first flow into the fuel pump.

For a better understanding of the present invention, together with other and further objects, reference is made to the following description, taken in conjunction with the accompanying drawings, and its scope will be pointed out in the appended claims.

DESCRIPTION OF THE INVENTION

Figure 1:
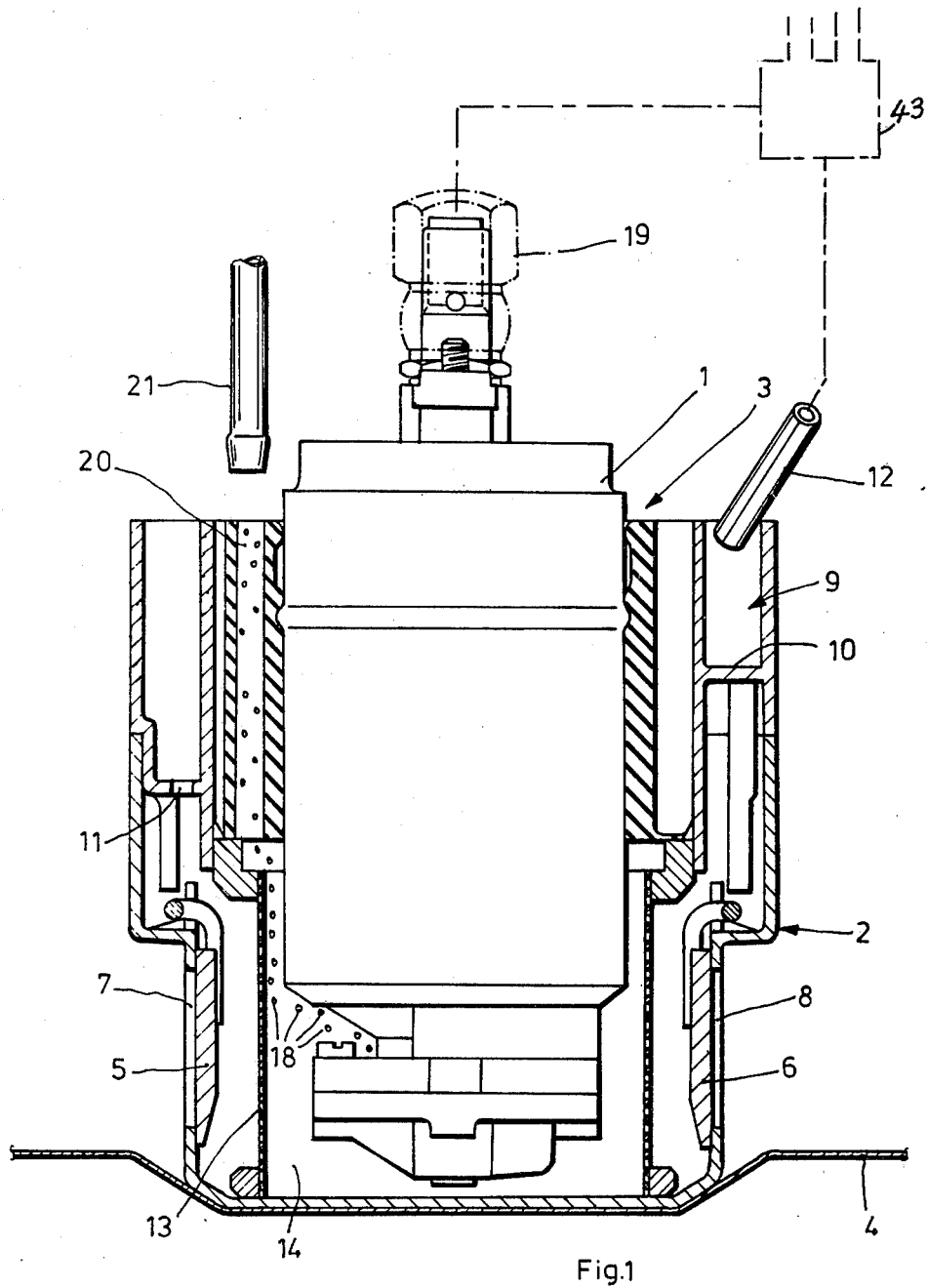
FIG. 1 is a cross-sectional view of a fuel pump assembly in accordance with the present invention.

FIG. 1 is a cross-sectional view of a fuel pump assembly in accordance with the present invention. The assembly is designed for mounting on the bottom floor of a vehicle fuel tank. The outlet of the fuel pump 19 is connected by a suitable outlet line, preferably a flexible line, through an appropriate socket on a wall of the fuel tank and thereafter to the carburetor or fuel injection mechanism of the vehicle.

The assembly shown in FIG. 1 includes an electric fuel pump 1 which mounted within a reserve fuel tank 2 by the use of a cylindrical resilient intermediate layer 3. Intermediate layer 3 may consist of an elastic plastic material which, in addition to providing a resilient mounting arrangement, also prevents the transmission of noises from fuel pump 1 to the tank 4. The reserve tank 2 is mounted to the bottom of tank 4 by means of welding or other suitable fastening.

Reserve tank 2 includes intake ports 7 and 8 which are provided with movable flaps 5 and 6. The flaps are mounted in a manner which permits the flow of fuel into the reserve tank, but prevents the reverse flow of fuel out of the reserve tank. Thus, when the vehicle travels around a curve, fuel will flow into the reserve tank from one side, but will be prevented from flowing out through the opposite side. Thus, the reserve tank arrangement maintains a quantity of fuel near the intake of fuel pump 1, located near the bottom of the reserve tank.

Figure 2:
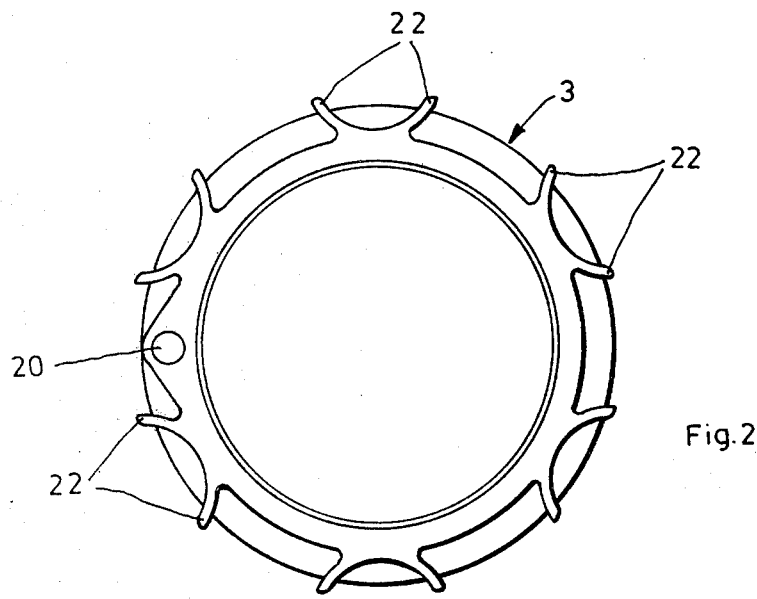
FIG. 2 is an end view of the intermediate resilient layer used in the FIG. 1 assembly.

An annular channel 9 is provided in the upper region of reserve tank 2 and is provided with a bottom 10 which has a helical arrangement and has an opening 11 near its lowest point, so that excess fluid outlet from pump 1 through outlet 19, which is not required by distributor or carburetor 43, can be returned over line 12 to channel 9 and then to the interior of reserve tank 2. In the embodiment illustrated annular channel 9 is open on the top so that any gas contained in returned fluid will escape over the open top and not be returned to the interior of the reserve tank. Thus fuel returned through opening 11 to the filter 13 has trapped gas removed. A filtering screen 13 is provided at the interior of tank 2 for screening fuel taken up by fuel pump 1. In the embodiment illustrated screen 13 is cylindrical in shape and has sufficient axial strength to support the lower end of the cylindrical intermediate layer 3. Between screen 13 and the intake of pump 1 there is formed an inlet chamber 14. As indicated by bubbles 18, the fluid delivered to flaps 5 and 6 directly from the tank may contain gas bubbles which should not be taken up into the fuel pump and conveyed over the discharge line to the vehicle fuel system. The assembly of FIG. 1 therefore includes a vent channel 20, which is connected to the intake chamber 14 at its lower end and to a vent conduit 21 at its upper end. In the FIG. 1 embodiment the vent channel 20 is formed as a hole which is molded into intermediate layer 3, as illustrated by the end view of the intermediate layer shown in FIG. 2. As illustrated in that drawing, the intermediate layer includes resilient ribs 22 which are compressed upon the insertion of the pump and intermediate layer into the reserve tank and serve to hold the pump firmly in the reserve tank. Vent conduit 21 is connected directly with channel 20 in a manner which prevents the entry of fuel from the surrounding tank volume into channel 20 thereby bypassing filtering screen 13. Conduit 21 may lead directly through the cover of the fuel tank, or alternately may lead to a high enough position within the fuel tank so that fuel does not flow in a reverse direction through conduit 21 to channel 20.

Figure 3:
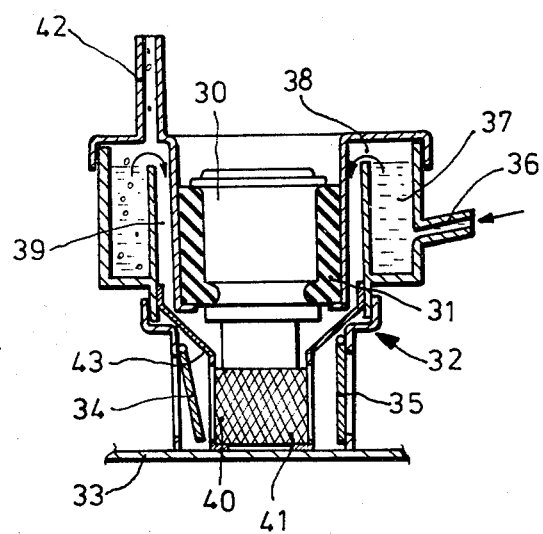
FIG. 3 is a cross-sectional view of an alternate arrangement in accordance with the present invention which provides for the return of excess fuel to the intake chamber.

FIG. 3 illustrates a cross-section of another pump assembly in accordance with the invention. In the FIG. 3 embodiment, pump 30 is mounted within reserve tank 32 by the use of intermediate resilient layer 31. Reserve tank 32 is fixed to the bottom 33 of a fuel tank in a conventional manner. Flaps 34 and 35 control the entry and out-flow of fuel at the lower portion of the reserve tank 32 which surrounds the intake of pump 30.

A first annular chamber 37 surrounds the fuel pump and the intermediate layer, and by way of an overflow element 38, is connected with an inner second annular chamber 39. The second annular chamber 39 opens at its lower end into the intake chamber 40 between pump 30 and filter screen 41. Thus annular chamber 39 provides a vent channel connecting intake chamber 40 with vent conduit 42 which is connected near the top of chamber 37. Funnel shaped member 43 prevents the direct entry of fluid from the tank into vent channel 39 bypassing screen 41. Excess fuel outlet from pump 30 is returned to annular chamber 37 over return line 36. Vent conduit 42 is arranged to open into annular chamber 37 in a manner which permits the removal of gas contained in the return fuel so that the fuel can directly flow through conduit 39 to intake chamber 40. Conduit 42 returns vapors to the upper level of the fuel tank or to an outside venting mechanism. Gas bubbles which occur in the intake chamber 40 between screen 41 and pump 30 are conveyed by channel 39 to vent conduit 42. The excess fuel outlet which is returned over line 36 can be returned directly to the intake chamber 40 since it has already passed through filtering screen 41.

While there have been described what are believed to be the preferred embodiments of the invention, those skilled in the art will recognize that other and further modifications may be made thereto without departing from the true spirit of the invention, and it is intended to claim all such embodiments as fall within the true scope of the invention.

We claim:

1. A fuel pump assembly for mounting within a vehicle fuel tank comprising a reserve tank which is arranged to stand essentially perpendicularly on the bottom of said fuel tank and which is equipped with valve means for allowing the influx of and preventing the outflow of fuel, a fuel pump having an inlet and mounted within said reserve tank by at least one noise dampening cylindrical intermediate layer, a filter screen mounted to said reserve tank, surrounding said pump inlet and forming an intake chamber, a vent conduit sealed against fluid entry from said fuel tank and a vent channel bypassing said intermediate layer and connecting said intake chamber upstream of said pump inlet with said vent conduit.

2. An assembly as specified in claim 1 wherein said vent channel extends within said intermediate layer.

3. An assembly as specified in claim 1 or 2 wherein said screen is cylindrical in shape and rendered strong in its axial direction thereby to support an axial end of said intermediate layer.

* * * * *